Figure 1:
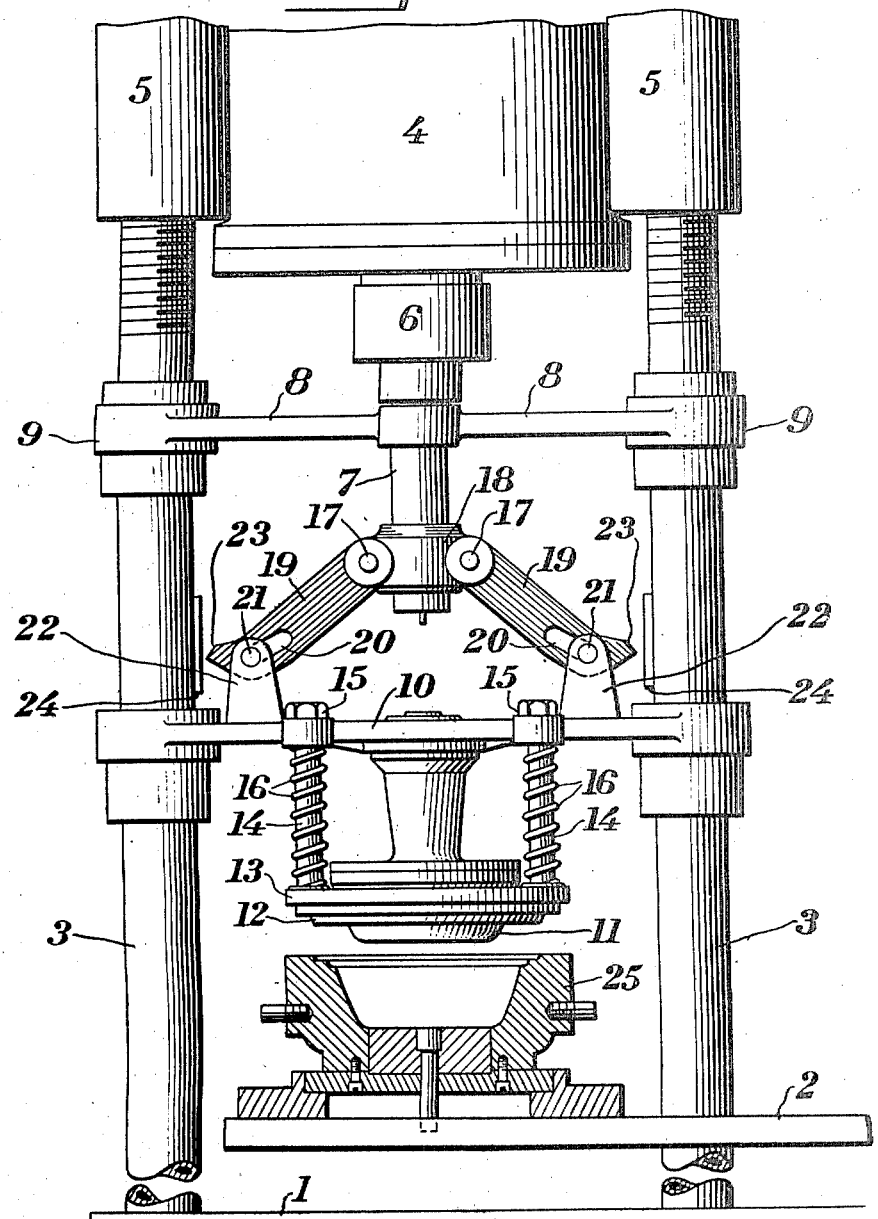

Jan. 29, 1924.

J. M. SAID 1,482,263

GLASS PRESSING MECHANISM

Filed Feb. 7, 1923      2 Sheets-Sheet 1

Jesse M. Said
INVENTOR

BY
ATTORNEY

Patented Jan. 29, 1924.

1,482,263

UNITED STATES PATENT OFFICE.

JESSE M. SAID, OF CORNING, NEW YORK, ASSIGNOR TO CORNING GLASS WORKS, OF CORNING, NEW YORK, A CORPORATION OF NEW YORK.

GLASS-PRESSING MECHANISM.

Application filed February 7, 1923. Serial No. 617,565.

*To all whom it may concern:*

Be it known that I, JESSE M. SAID, a citizen of the United States, residing at Corning, in the county of Steuben and State of New York, have invented new and useful Improvements in Glass-Pressing Mechanism, of which the following is a specification.

This invention relates to certain improvements in machines for forming articles of glassware. I have illustrated my invention in the accompanying drawings as applied to the glass press shown in United States Patent No. 1,171,928, issued February 15, 1916, to George E. Cleveland, but it will be understood that the same may be likewise applied to other glass working apparatus.

The prime object of my present invention is to provide new and useful improvements in the plunger actuating mechanism of glass pressing machines. In the specific embodiment of my invention which I have chosen for illustration purposes, my invention comprises the use of levers which are connected to the end of the piston-rod of the fluid pressure cylinder of a glass working apparatus and to the plunger cross-head, so that increased pressure will be imparted to the plunger, as the piston-rod descends. In this manner novel means are provided for utilizing low fluid pressure to obtain sufficient plunger pressure so that better results are obtained in the finished articles.

My invention also comprises certain new and useful improvements in the construction, arrangement and combination of the several parts of which it is composed as will be hereinafter more fully described and claimed.

In the accompanying drawings:—

Figure 1, is a front elevation, partly in section of a glass pressing mechanism constructed according to my invention, the plunger being shown raised, and Fig. 2, is a similar view, showing the plunger in the mold bottom.

Referring to the drawings, the various parts of my improved mechanism are carried on a base 1, above the upper surface of which is a revolubly mounted mold table 2. Arising from the base 1, is a pair of vertical standards 3, one of said standards being located outside of the periphery of the table 2, while the other standard is passed upwardly through a central opening in the table 2.

The upper ends of the standards 3 are threaded and on them is mounted for vertical movement the press head. This comprises a casting 4, in the form of a cylinder having side ears 5, which are vertically bored to receive the standards 3.

Mounted within the cylinder and projecting through a stuffing box 6 on the lower end thereof is a piston-rod 7. Fixed to the piston-rod 7 near the lower end thereof are laterally extending arms 8, which are provided with collars 9 that slide on the standards 3. The arms 8 serve as means for guiding the piston-rod.

Slidingly mounted on the standards 3 is another cross-head 10. A press plunger 11 adapted, as will be hereinafter described, to enter the mold, is carried by and depends downwardly from the cross-head 10 between the standards 3. A mold ring 12 is secured to the underside of an annular ring 13, which is centrally apertured to permit the passage of the plunger 11 therethrough in the pressing, the ring 13 having attached thereto lower ends of rods 14, which project upwardly therefrom, and passing through the cross-head 10 have their upper ends provided with heads 15. A spiral spring 16 encircles each rod 14 for the purpose of maintaining normal distance between the annular ring 13 and the cross-head 10, and to absorb shock incident upon the cross-head when pressing.

Pivotally mounted by means of pins 17, which are carried by a collar 18, that is fixed to the lower end of the piston-rod 7, are pairs of oppositely arranged arms 19. These arms are in the nature of levers, and near their outer ends they are provided with slots 20, through which are passed pivot pins 21 that are mounted in ears 22 formed integral with the cross-head 10 and projecting upwardly therefrom. The outer end of the arms 19 are provided with noses 23 which engage notches 24 formed on the standards 3 as shown.

When the piston-rod 7 is in raised position, as shown by Fig. 1, of the drawings, the noses 23 of the arms 19 will be out of engagement with the notches 24, due to the fact that the piston-rod 7, in moving upwardly from the bottom of its stroke, has pulled the arms 19 upwardly to an inclined angle whereby the pins 21 will be in the outer extremities of the slots 20. In this manner the cross-head 10 and associated parts will be raised above the mold bottom, but the distance in which the plunger is moved upwardly is only approximately one half of that travelled by the piston-rod 7.

Assuming that the apparatus is in operation and the parts are in the position shown by Fig. 1, when it is desired to cause the descent of the plunger 11, the pressure is first released in the air cylinder 4. This action causes a quick descent of the piston-rod 7, and also of the cross-head 10 and plunger 11, due to the extreme heavy weight of these parts of the apparatus which drop by gravity until the plunger strikes the molten glass that has been deposited in one of the mold bottoms 25 carried by the mold table 2.

As soon as the plunger 11 strikes the glass in the mold bottom, the force exerted by the piston-rod 7 on the arms 19 will cause the noses 23 of the arms to engage with the notches 24. Further downward movement of the piston rod will be amplified by the additional pressure that will be exerted upon the cross-head 10 through the arms 19 which now become levers with the pivot pins 21 serving as fulcrums. Due to the fact, that the pivot pins 21 are positioned adjacent to the noses 23, when the piston-rod 7 continues to move downwardly after the noses 23 have engaged the notches 24, the pressure transmitted to the plunger 11 will be considerably increased until the lower end of the piston-rod strikes the top of the cross-head 10 when further downward movement of the plunger actuating mechanism will be halted.

As is well known the construction of manually operated glass working apparatus is such that the pressing plunger is first brought quickly down into the molten glass in the mold, and then the downward movement of the plunger is retarded, while the plunger force is increased, whereby the glass will be properly distributed throughout the mold cavity. In order to produce a like movement of the pressing plunger of a fluid pressure glass working apparatus, by the present invention, I have provided mechanical elements that are actuated by the piston-rod of the apparatus in such manner that the pressing plunger is first moved downwardly at rapid speed with comparatively little force, and later the speed of the plunger is retarded while the force exerted by the plunger is considerably increased, as will be readily understood.

Having thus described my invention what I claim and desire to secure by Letters Patent is:—

1. In a glass pressing mechanism, the combination of vertical standards provided with notches, a plunger cross-head slidably mounted on the standards, a fluid pressure cylinder having a piston-rod depending therefrom, and levers connected to the piston-rod and to the cross-head, said levers having extensions for engaging the notches in the said standards.

2. In a glass pressing mechanism, the combination of vertical standards provided with notches, a plunger cross-head slidably mounted on the standards, a fluid pressure cylinder having a piston-rod depending therefrom, levers connecting the piston-rod and the cross-head, said levers having slots formed therein to receive the cross-head connections, and noses formed on the levers for engaging the notches in the said standards.

3. In a glass pressing mechanism, the combination of vertical standards provided with notches, a plunger cross-head slidably mounted on the standards, a fluid pressure cylinder having a piston-rod depending therefrom, levers connecting the piston-rod and the cross-head, said levers having noses which are adapted to engage the notches on the standards when the piston-rod is lowered, and means formed on the levers for maintaining the noses out of engagement with the notches when the piston-rod is raised.

4. In a glass pressing mechanism having a fluid operated piston-rod for actuating the press plunger, the combination with a plunger cross-head slidably mounted on vertical standards that are provided with notches, of means connecting the piston-rod and cross-head and adapted to engage said notches upon the descent of the piston-rod and thereby exert an increase in pressure against the cross-head.

In testimony whereof I hereunto sign my name.

JESSE M. SAID.